(12) United States Patent
Leonard

(10) Patent No.: US 8,799,926 B1
(45) Date of Patent: Aug. 5, 2014

(54) ACTIVE NODE DETECTION IN A FAILOVER COMPUTING ENVIRONMENT

(75) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1072 days.

(21) Appl. No.: 12/346,119

(22) Filed: Dec. 30, 2008

(51) Int. Cl.
G06F 9/44 (2006.01)
G06F 9/46 (2006.01)

(52) U.S. Cl.
USPC .......................................... 719/318; 709/248

(58) Field of Classification Search
None
See application file for complete search history.

(56) References Cited

U.S. PATENT DOCUMENTS

| 2003/0061220 A1* | 3/2003 | Ibrahim et al. | 707/10 |
| 2005/0125464 A1* | 6/2005 | Kline | 707/204 |
| 2005/0183093 A1* | 8/2005 | Pope et al. | 719/314 |

* cited by examiner

Primary Examiner — H S Sough
Assistant Examiner — Umut Onat (57) ABSTRACT

A method, system, and medium are provided for determining whether a program (e.g., a queue manager) is currently an active program in a failover computing environment. A failover environment includes pairs of programs capable of performing the same functions. One program in the pair is the primary program and the other is the backup program. Only one of the two programs is active at any given time. Embodiments of the present invention may determine whether a program is active by looking for a core configuration file in the file directory associated with the program. The program only has access to the core configuration file when the program is active. The activation status of a program may be communicated to other components that monitor the program so that the program's activity or lack of activity can be correctly interpreted.

20 Claims, 7 Drawing Sheets

ACTIVE NODE DETECTION IN A FAILOVER COMPUTING ENVIRONMENT

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of discovering whether an individual queue manager is currently active in a failover environment that includes at least two computing devices and a data store that is accessible to the at least two computing devices are provided. The method includes, for each queue manager installed on a computing device, determining a file directory associated with a queue manager. The method also includes determining whether said each queue manager has access to a core configuration file through file directories associated with said each queue manager. The core configuration file is accessible through the file directory when the queue manager is active and the core configuration file is not accessible through the file directory when the queue manager is inactive. The method also includes communicating an instruction to monitor the each queue manager associated with a file directory determined to have access to the core configuration file.

In another illustrative embodiment, one or more computer-readable media having computer-executable instructions embodied thereon for performing a method of determining whether a program that is installed on a computing device is active are provided. The method includes identifying a file directory associated with a backup program that is one of a plurality of programs installed on the computing device. The program is part of a failover cluster that includes at least one pair of programs that are capable of performing the same functions. The at least one pair of programs includes the backup program installed on the computing device and a primary program installed on a different computing device. The backup program is activated when the primary program is deactivated. The at least one pair of programs requires access to a common configuration object located in a data store to operate. The method also includes determining that the backup program does not currently have access to the common configuration object. The method further includes storing a record that indicates the backup program should not be monitored.

In a third illustrative embodiment, one or more computer-readable media having computer-executable instructions embodied thereon for performing a method of determining whether a queue manager in a clustered failover environment is active are provided. The method includes identifying a queue manager installed on a first computing device, wherein the queue manager is part of a failover cluster that includes at least one pair of queue managers capable of performing the same functions. The at least one pair of queue managers includes the queue manager, which is installed on a first computing device, and a backup queue manager installed on a second computing device. The at least one pair of queue managers requires access to a core configuration file located in a data store to operate. The method further includes determining that the queue manager does not have access to the core configuration file. The method further includes storing a record that indicates the at least one queue manager should not be monitored.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the invention generally relate to a method determining whether a particular program in a failover clustered environment is currently active. A failover clustered environment includes a pair of programs capable of performing the same functions. The pair includes a primary program and a backup program. The backup program becomes active only when the primary program fails. A program is active when it is currently tasked with performing a function, regardless of whether the function is actually being performed. In one embodiment, the primary program and the backup program are installed on different computers. The programs may be queue managers that are tasked with managing queues in a messaging-middleware environment. As will be explained in more detail, a queue facilitates the transfer of messages from one program to another by holding the messages for a period of time. The operation of the queues may be managed by queue management software. As explained subsequently in more detail, software that monitors the programs can become confused regarding whether the primary program or the backup program is presently active. Embodiments of the present invention automatically determine which of two programs is active. Error message from the nonactive program may be ignored or disabled.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CPU Central Processing Unit
CDMA Code Division Multiple Access
CD-ROM Compact Disk Read Only Memory
DVD Digital Versatile Discs
EEPROM Electrically Erasable Programmable Read Only Memory
GSM Global System for Mobile Communications
IP Internet Protocol
IMS IP Multimedia Subsystem
LAN Local Access Network
LCD Liquid Crystal Display
PDA Personal Digital Assistant
PDSN Packet Data Serving Node/Home Agent
RAM Random Access Memory
ROM Read Only Memory
TDMA Time Division Multiple Access
URL Uniform Resource Locator
WAN Wide Area Network Embodiments of the present invention may be embodied as, among other things: a method, system, or computer-program product.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

As stated above, the embodiments of the present invention may be, among other things: a method, system, or computer-program product that is implemented as software, hardware or a combination of the two, or as computer-readable media having computer-usable instructions embodied thereon. In these embodiments, an exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
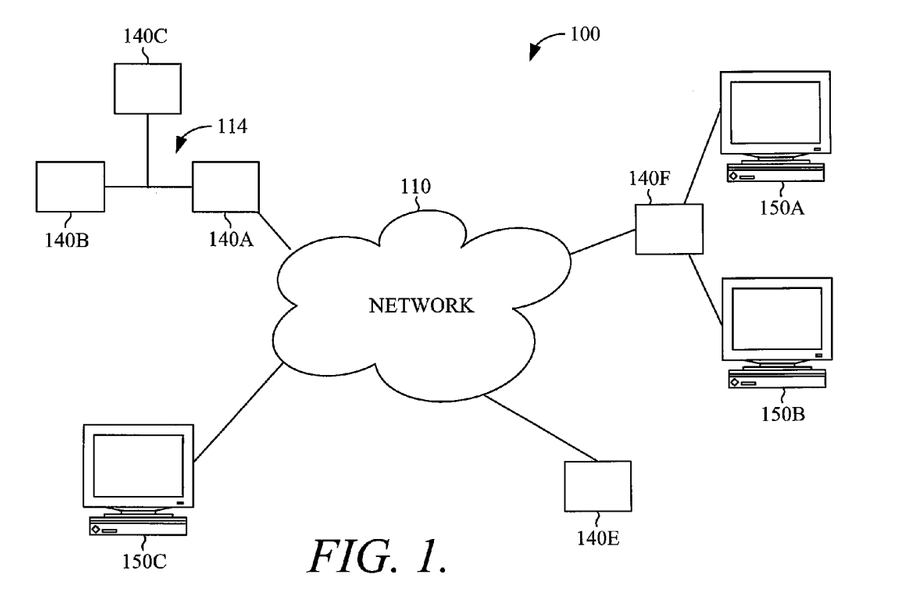
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smart phone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
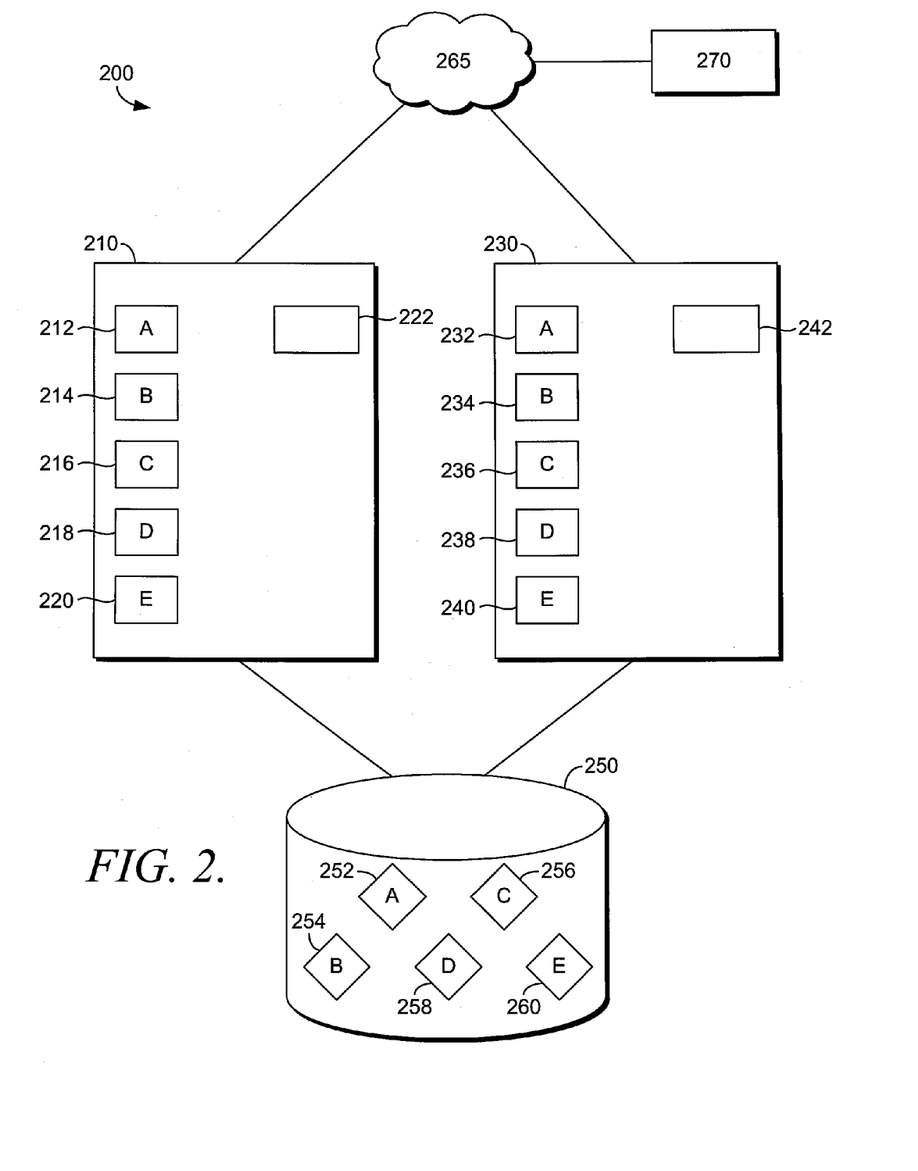
FIG. 2 is a block diagram that depicts exemplary computing system architecture that is suitable for determining whether a queue manager is active, according to an embodiment of the present invention.

Turning now to FIG. 2, a block diagram depicting exemplary computing system architecture 200, which is suitable for determining whether a queue manager is active, is shown in accordance with an embodiment of the present invention. The exemplary computing system architecture 200 shown in FIG. 2 is merely an example and is not intended to suggest any limitation as to the scope of use or functionality of embodiments of the present invention. Neither should the exemplary computing system architecture 200 be interpreted as having any dependency or requirement related to any single component or combination of components illustrated therein.

Exemplary computing system architecture 200 includes computing device 210 and computing device 230. Computing device 210 includes queue manager A 212, queue manager B 214, queue manager C 216, queue manager D 218, queue manager E 220 and monitoring component 222. Computing device 230 includes queue manager A 232, queue manager B 234, queue manager C 236, queue manager D 238, queue manager E 240, and monitoring component 242. Data store 250 includes core configuration file A 252, core configuration file B 254, core configuration file C 256, core configuration file D 258, and core configuration file E 260. Computing system architecture 200 also includes network 265, and enterprise response component 270. Exemplary computing system architecture 200 may reside in a distributed computing environment that includes multiple computing devices coupled with one another via one or more networks, for example, operating environment 100 described with reference to FIG. 1.

Computing device 210 and computing device 230 could be similar to servers 140A-F described with reference to FIG. 1. Similarly, network 265 could be similar to network 110 described with reference to FIG. 1. Computing device 210 and 230 may share a single virtual IP address. Communications received at the virtual IP address from network 265 could then be routed to the intended destination on either computing device 210 or computing device 230.

The letter associated with a queue manager is intended to show the functions the queue manager is capable of performing. For example, queue manager A 212 and queue manager A 232 are both capable of performing the functions A. The functions performed by a queue manager will be explained in more detail subsequently. Queue manager A 212 and queue manager A 232 are a failover pair. One of the two queue managers is the primary queue manager and the other is the backup queue manager. When the primary queue manager fails the backup queue manager takes over the functions that were being performed by the primary queue manager. Each queue manager on computing device 210 is paired with a queue manager on computing device 230. This setup is referred to as a clustered failover environment, since each queue manager will failover to a backup queue manager if it experiences problems.

The queue managers are part of a messaging-middleware application that is configured to transfer information between two or more applications in the form of messages. The queue managers manage queues that are each used to hold the messages sent between applications. Examples of commercially available messaging-middleware applications (a.k.a message-oriented middleware) include IBM's WebSphere® MQ (formerly MQ Series®), Fiorano's MQ, Oracle Advanced Queuing (AQ), and Microsoft's MSMQ. The messaging-middleware application can be any application that uses queues to transfer messages from one application to another. For example, information from a front-end application is formed into one or more messages. These messages from the front-end application are placed in a sending queue that may be managed by one of the queue managers and transferred into a receiving queue that may be managed by a different one of the queue managers. A back-end program retrieves the message from the receiving queue. The message is transmitted through channels within the messaging-middleware application. In this example, the front-end program and the backend program could be located on any computing device communicatively coupled to the one or more computers on which the queue managers reside. A messaging-middleware client may reside on both of the computing devices on which the front-end and back-end programs reside to allow interaction with the messaging-middleware application.

A single queue manager may manage thousands of queues. In a clustered failover computing environment, a primary queue manager has a backup queue manager that is ready to actively handle message traffic if the primary queue instance and/or primary queue manager has difficulties managing the message traffic. As explained previously, the primary queue manager and the backup queue manager are designated with the same letter. Thus, the queue manager A 212 and queue manager A 232 are a primary and backup pair of queue managers. Similarly, queue manager B 214 and queue manager B 234 are a primary and backup pair of queue managers. As described previously a queue transfers messages between two programs. The primary queue manager manages queue instances that transfer the same type of message between the same two programs as the queue instances managed by the backup queue manager. Thus, if eight primary queue instances are managed by a primary queue manager, then eight backup queue instances would exist and be managed by a backup queue manager. The primary and backup queue managers may be essentially the same to one another. For example, queue manager A 212 may manage a primary queue instance and queue manager A 232 may manage a backup queue instance. Both the primary queue instance and backup queue instance receive the same type of messages sent between the same two applications. Only one of the queue instances and associated queue manager is active at a time. Thus, the primary and backup queue managers receive the same types of messages sent between the same applications, but the primary and backup queue instances are not both receiving messages at the same time.

The queue instances within the messaging-middleware application are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is preset, but the current queue depth attribute changes based on the number of messages in the queue. Queue depth is a measure of data in the queue at a particular time. Throughout this disclosure preset attributes will be associated with settings, and attributes that are based on queue conditions are associated with attribute values. The primary attribute settings and values that are involved in embodiments of the present invention include a message-in value, a message-out value, a reset time interval setting, an active application interface value, and a priority setting. Many other attributes may be used to describe a queue and may be accessed or modified in embodiments of the present invention.

Monitoring components 222 and 242 are configured to monitor queues and queue managers for upset conditions that may require corrective actions. Examples of commercially available monitoring components include HP Openview®, Q Pasa!® by MQSoftware, Candle's PathWAI, and BMC Patrol. The monitoring components 222 and 242 may retrieve, store, and evaluate queue values periodically to ascertain whether an upset condition is present. For example, the current depth of the queue could be retrieved periodically. Having retrieved one or more attribute values, the one or more attribute values may be evaluated against threshold values within the monitoring components 222 and 242. The monitoring components 222 and 242 may generate an alarm or incident message if attribute values are outside of normal operating conditions. The monitoring components 222 and 242 may perform one or more calculations with the one or more attribute values to arrive at a value that is compared against a threshold. For example the monitoring components 222 and 242 may calculate the message throughput by dividing the outgoing messages during a period of time by the incoming messages during the period of time. The message throughput may then be compared against a threshold throughput and an incident message generated if the message throughput is within a cautionary range.

The monitoring components 222 and 242 also may be configured to generate and transmit notifications describing potential problems within a queue or queue manager. A problem may be indicated when one or more attribute values or calculated values fall outside of a normal operating range. In one embodiment, the information about the potential problem is transmitted to enterprise response component 270. In another embodiment, the monitoring components 222 and 242 directly notify a designated responder or other component about the potential problem.

Enterprise response component 270 is configured to coordinate a response to a problem detected in a queue or queue manager. The enterprise response component 270 may receive information regarding a malfunction from monitoring components 222 and 242 or another source. Upon receiving notification of a malfunction, the monitoring components 222 and 242 may page a designated responder to investigate the upset condition. A designated responder may be an individual person or group of people given responsibility to fix upset conditions within certain queues. In another embodiment, the designated responder may be a computer application that takes corrective actions, such as a service agent (not shown).

The data store 250 is configured for storing information related to a queue manager including historical performance data, queue settings, and configuration files. The core configuration files stored in data store 250 include core configuration file A 252, core configuration file B 254, core configuration file C 256, core configuration file D 258, and core configuration file E 260. A core configuration file contains information necessary to configure a queue manager for operation. In a failover cluster environment, only an active queue manager has access to the corresponding core configuration file. Access to a core configuration file may be managed by a component that controls the failover functionality of the various queue managers.

Figure 3:
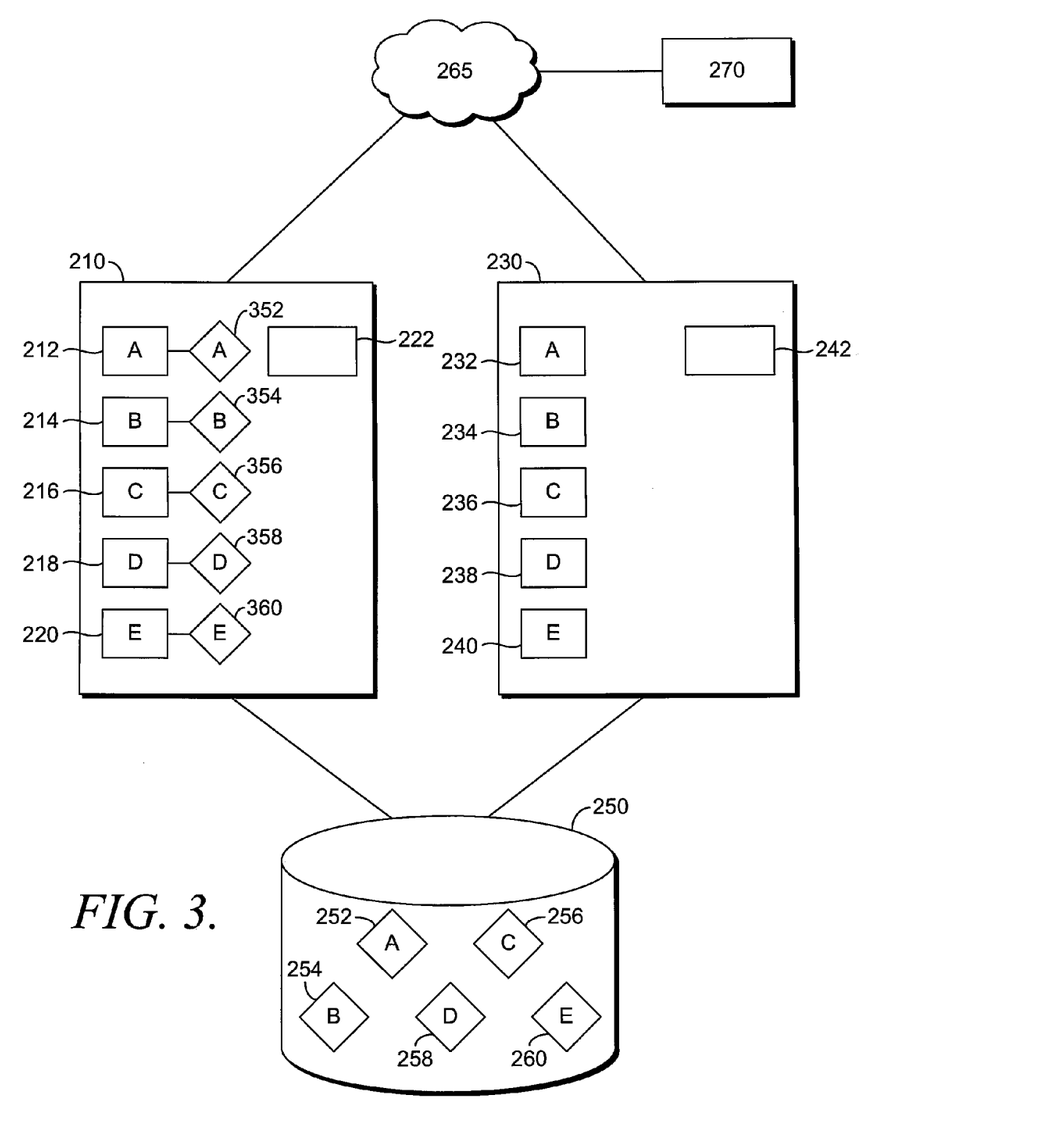
FIG. 3 illustrates core configuration files mounted to active queue managers, in accordance with an embodiment of the present invention.

The letter after the core configuration files in FIG. 3 corresponds to the functions performed by the queue manager with which the individual core configuration file is associated. For example, core configuration file B 254 is associated with queue manager B 214 and queue manager B 234. At any give time, either queue manager B 214 or queue manager B 234 will have access to core configuration file B 254. Queue manager B 214 and queue manager B234 may not both have access to core configuration file B 254 at the same time.

Turning now to FIG. 3, the mounting of core configuration files to active queue managers is illustrated, in accordance with an embodiment of the present invention. Computing device 210 and computing device 230, have been described previously with reference to FIG. 2. Similarly, the queue managers (queue manager A 212, queue manager B 214, queue manager C 216, queue manager D 218, queue manager E 220, queue manager A 232, queue manager B 234, queue manager C 236, queue manager D 238, queue manager E 240) and monitoring components 222 and 242 have been described previously with reference to FIG. 2. Data store 250, core configuration file A 252, core configuration file B 254, core configuration file C 256, core configuration file D 258, core configuration file E 260, network 265 and enterprise response component 270 have also been described previously with reference to FIG. 2.

In FIG. 3, queue manager A 212, queue manager B 214, queue manager C 216, queue manager D 218, and queue manager E 220 are all actively managing queues. As described previously, each active queue manager requires access to its corresponding core configuration file to function. Each of the active queue managers is shown with a corresponding core configuration file mounted to its file directory. Core configuration file A 352 is mounted to the file directory associated with queue manager A 212. Core configuration file B 354 is mounted to the file directory associated with queue manager B 214. Core configuration file C 356 is mounted to the file directory associated with queue manager C 216. Core configuration file D 358 is mounted to the file directory associated with queue manager D 218. Core configuration file E 360 is mounted to the file directory associated with queue manager E 220. Core configuration files are not mounted to the queue managers installed on computing device 230 because none of those queue managers are active.

Mounting or mapping the core configuration file to a queue manager gives the queue manager access to the core configuration file. The core configuration files may not actually be moved to computing device 210. The depiction of core configuration files on computing device 210 illustrates that the queue mangers on computing device 210 each have access to their corresponding core configuration file. By mounting the core configuration file to the file directory associated with the queue manager, the queue manager can access the core configuration file. Once the core configuration file is mounted to the file directory associated with the queue manager, the core configuration file can be accessed by other components with access to the queue manager's file directory. For example, monitoring component 222 may access the file directories associated with each queue manager installed on computing device 210, and by extension can access a core configuration file mounted to a file directory associated with the queue manager. The queue managers on computing device 210 may be described as the primary queue-managers. The queue-managers on computing device 230 may be described as the backup queue managers. Core configuration files may be mounted to a file directory by a component (not shown) that managers the failover functionality of the queue managers on computing devices 210 and 230. Upon switching between queue managers, the core configuration file is unmounted from the file directory associated with a primary queue manager and mounted to the corresponding file directory associated with the backup queue manager.

Figure 4:
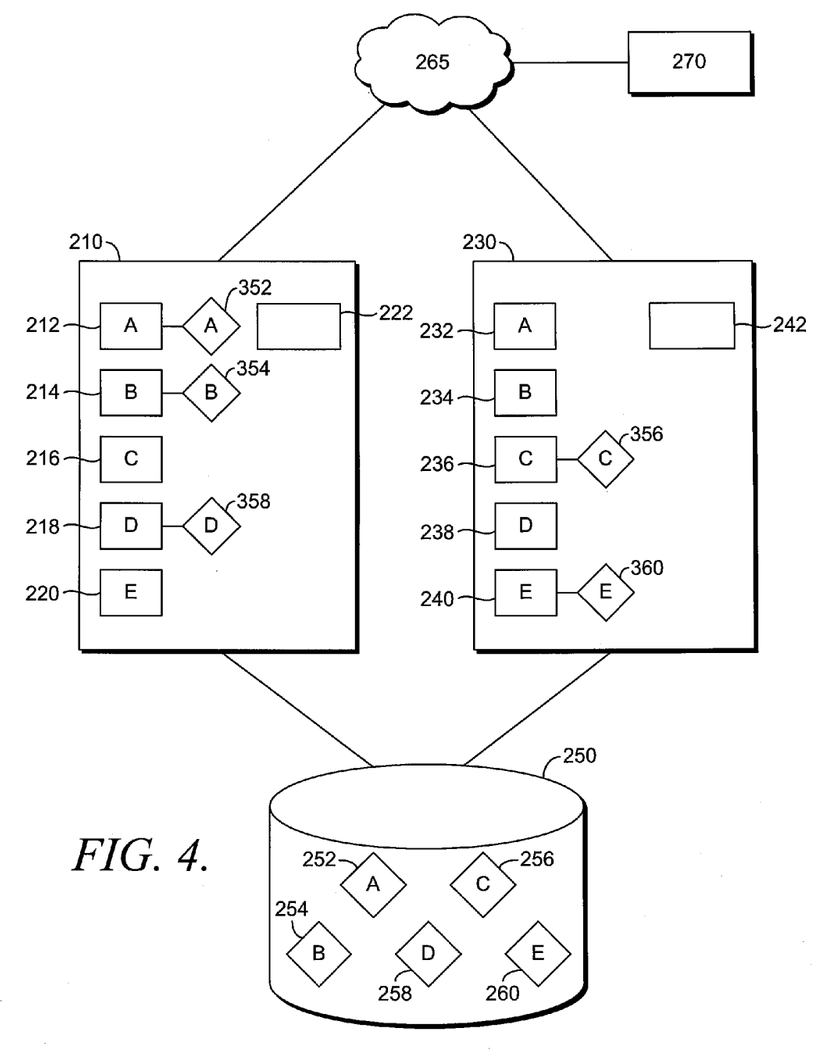
FIG. 4 illustrates core configuration files mounted to active queue managers, in accordance with an embodiment of the present invention.

Turning now to FIG. 4, the distribution of active queue managers between two different computing devices is illustrated, in accordance with an embodiment of the present invention. Computing device 210 and computing device 230, have been described previously with reference to FIG. 2. Similarly, the queue managers (queue manager A 212, queue manager B 214, queue manager C 216, queue manager D 218, queue manager E 220, queue manager A 232, queue manager B 234, queue manager C 236, queue manager D 238, queue manager E 240) and monitoring components 222 and 242 have been described previously with reference to FIG. 2. Data store 250, core configuration file A 252, core configuration file B 254, core configuration file C 256, core configuration file D 258, core configuration file E 260, network 265, and enterprise response component 270 have also been described previously with reference to FIG. 2

In contrast to FIG. 3, queue manager C 216 and queue manager E 220 no longer have corresponding core configuration files mounted to their file directories. In one embodiment, queue manager C 216 and queue manager E 220 are deactivated because they experienced a failure. For the purpose of this illustration, the reason why the queue managers have failed is not important. Upon failing, the core configuration file is mounted to the file directory association with their backup queue managers. In this case, queue manager C 236 is the backup queue manager to queue manager C 216 and queue manager E 240 is the backup queue manager for queue manager E 220. Core configuration file C 356 is mounted to the file directory associated with queue manager C 236. Similarly, core configuration file E 360 is mounted on the file directory associated with queue manager E 240. As in FIG. 3, core configuration file A 352 is mounted to the file directory associated with queue manager A 212. Core configuration file B 354 is mounted on the file directory associated with queue manager B 214. And, core configuration file D 358 is mounted on the file directory associated with queue manager D 218.

FIG. 4 illustrates that, in a cluster failover environment, queue managers may be active on two different computing devices. However, this is just one embodiment. In other embodiments, all of the queue managers on a computing device may failover simultaneously to queue managers on a different computing device. As described previously, the corresponding backup and primary queue manager on either one, but not both, of computing devices 210 and 230 would be operating at any given time.

Figure 5:
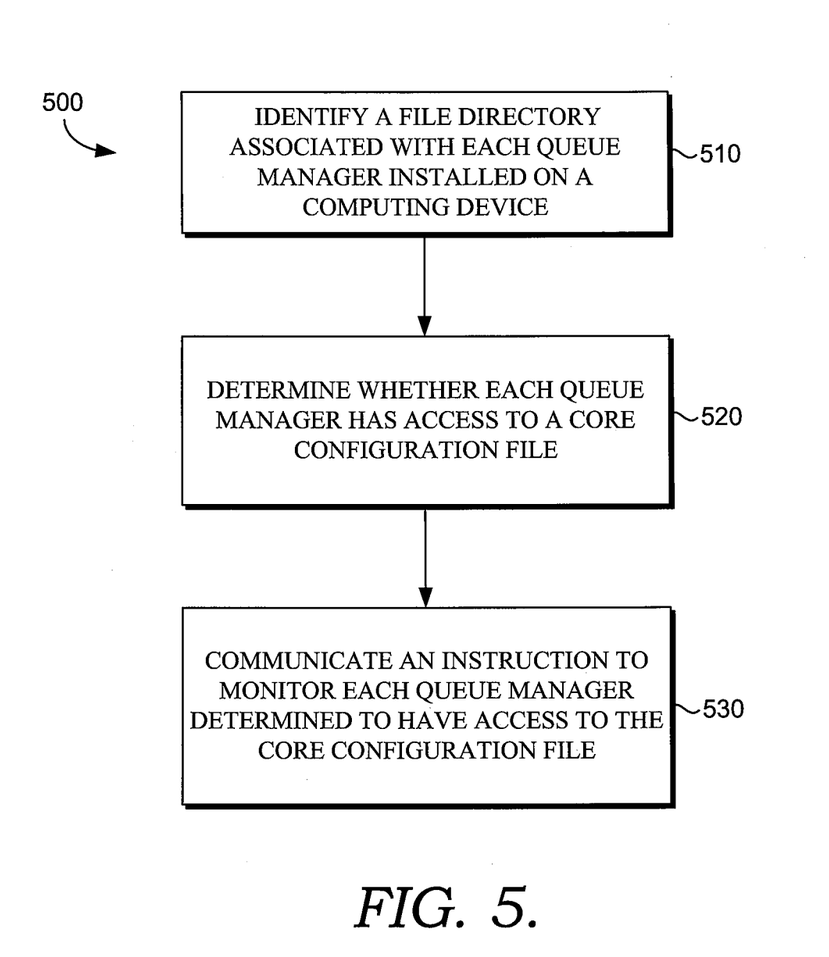
FIG. 5 is a flow diagram in which a method of discovering whether an individual queue manager is currently active in a failover environment that includes at least two computing devices and a data store that is accessible to the at least two computing devices is described, according to an embodiment of the present invention.

Turning now to FIG. 5, a method 500 of discovering whether an individual queue manager is currently active in a failover environment that includes at least two computing devices and a data store that is accessible to the at least two computing devices is illustrated, in accordance with an embodiment of the present invention. The two computing devices and data store could be arranged as described with reference to FIG. 2. A failover environment is an environment with primary programs and backup programs. When the primary program fails, the backup program comes online and takes over the functions that were previously being performed by the primary program. In FIG. 5, the programs are queue managers. As described previously, the queue managers may be part of a messaging-middleware application and may manage queues that are used to transfer messages from one application to another application.

At Step 510, for each queue manager installed on a computing device, a file directory associated with a queue manager is identified. Each queue manager may be assigned its own file directory. The file directory contains the executable files and data files needed for the queue manager to function. The file directory may be broken down into various hierarchical levels. In one embodiment, the file directories associated with a queue manager are identified by consulting a list of queue managers installed on a computing device. In another embodiment, the memory of the computing device is scanned and file directories associated with queue managers are identified according to the nomenclature used to describe the file location. For example, each queue manager may be assigned a file directory at a certain hierarchical level within the computing device's memory. The top level of each file directory associated with a queue manager may be named in such a way that the file directory can be identified as associated with a particular queue manager.

At Step 520, whether each queue manager installed on the computing device has access to a core configuration file through the file directory is determined. For example, with reference to FIG. 4, on computing device 230 queue manager C 236 and queue manager E 240 have access to their corresponding core configuration files. As explained previously, the core configuration file is accessible through the file directory only when the queue manager is active. The core configuration file is not accessible through the file directory when the queue manager is inactive. As explained previously, the core configuration file may be located on the data store and mounted to the file directory associated with the queue manager when that queue manager is active. The file directory containing the core configuration file may be unmounted when the associated queue manager becomes inactive. In one embodiment, the core configuration file is a QM.INI file that is stored in the data store. Other types of core configuration files may be used to determine whether a queue manager is active.

Thus, the activation status of a queue manager may be determined by the queue manager's access to a core configuration file. A queue manager is active in a failover environment when it should be processing messages and managing queues assigned to the queue manager. The queue manager does not actually have to be processing messages. For example, there may be no messages to process at a particular time, yet, the queue manager is active. Similarly, the queue manager may actually have malfunctioned and not be operating yet still be active because the core configuration file may be accessed through the file directory associated with the queue manager.

At Step 530, an instruction to monitor each queue manager associated with a file directory determined to have access to the core configuration file is communicated. For example, with reference to FIG. 4, an instruction to monitor queue manager C 236 and queue manager E 240 could be generated after an analysis of computing device 230. In one embodiment, the instruction is communicated to a monitoring component, such as monitoring component 242, tasked with monitoring the status of the queue managers installed on the computing device. Instructing the monitoring component that the queue manager(s) is/are active allows the monitoring component to correctly interpret activity or lack of activity associated with the queue manager. For example, a queue manager may be installed on a computing device and not be processing messages. If the queue manager were active, the lack of activity may indicate a problem that would cause the monitoring component to generate an alarm. On the other hand, if the monitoring component knows that the particular queue manager that is not processing messages is inactive, then the monitoring component does not need to generate an alarm.

The monitoring component may receive either an instruction that the queue manager is active or that it is inactive and take appropriate action. The monitoring component may change a setting associated with the queue manager in response to receiving an instruction indicating the active or inactive status of the queue manager. In one embodiment, method 500 is repeated before each monitoring cycle to help the monitoring component determine how the actions or lack of action of a particular queue manager should be interpreted.

Figure 6:
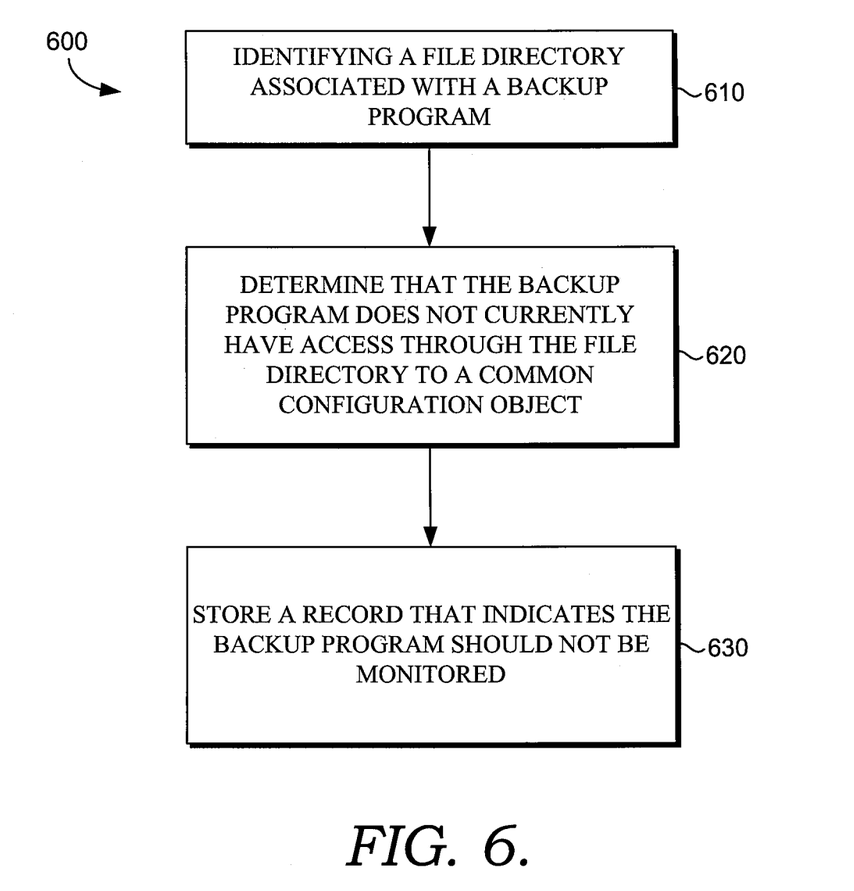
FIG. 6 is a flow diagram in which a method of determining whether a program that is installed on a computing device is active is described, according to an embodiment of the present invention.

Turning now to FIG. 6, a method 600 of determining whether a program that is installed on a computing device is active is illustrated, in accordance with an embodiment of the present invention. As described previously, a program is active when it has responsibility to perform certain functions. The program does not necessarily have to be performing the functions at a given point in time to be considered active. For example, in a failover environment, a primary program may be active under normal circumstances and the backup program would be inactive. This means that the primary program has responsibility for performing the designated functions. When a primary program fails, the backup program may take over and would then be considered the active program and be responsible for performing the designated functions as needed. The backup program would be considered the active program even if there were no functions to perform at the time it became the active program, since it was responsible to perform the functions if needed.

At Step 610, the file directory associated with a backup program is identified. The backup program is one of the plurality of programs installed on a computing device. The program is part of a failover cluster that includes at least one pair of programs that are capable of performing the same functions. For example, both programs may be queue managers that are capable of receiving messages from a first application and holding those messages until they are retrieved by a second application. Thus, both the primary program and the backup program are capable of performing the functions related to managing this message traffic. The at least one pair of programs includes a backup program installed on the computing device and a primary program installed on a different computing device. The backup program is activated when the primary program is deactivated. The at least one pair of programs requires access to a common configuration object located in a data store to operate. For example, the primary program may require access to a common configuration directory, core configuration file, or QM.INI file to operate. The backup program would not have access to these common configuration objects at the same time as the primary program. Thus, it can be determined whether the primary program or the backup program is active by evaluating whether or not a designated common configuration object may be accessed through the file directory associated with the program.

At Step 620, the backup program is determined not to currently have access through the file directory to the common configuration object. Thus, the backup program may be determined not to be active at the time the determination is made. At Step 630, a record that indicates the backup program should not be monitored is stored. In one embodiment, the Steps 610, 620, and 630 are repeated for each monitoring cycle. A monitoring cycle may be performed every few minutes by a monitoring component, such as monitoring component 222. As described previously, the primary program and the backup program may be queue managers associated with a messaging-middleware component. The queue managers may manage queues that are used to transfer messages between applications.

Figure 7:
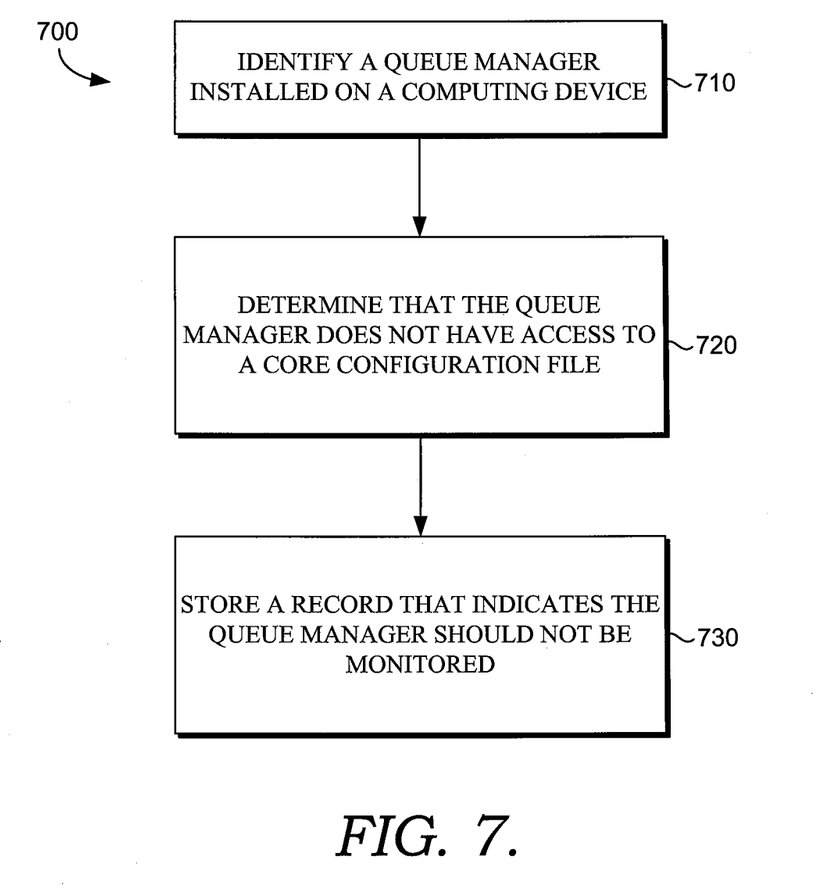
FIG. 7 is a flow diagram in which a method of determining whether a queue manager in a clustered failover environment is active is described, according to an embodiment of the present invention.

Turning now to FIG. 7, a method 700 of determining whether a queue manager in a clustered failover environment is active is illustrated, in accordance with an embodiment of the present invention. A failover cluster environment has been described previously with reference to FIG. 2.

At Step 710, a queue manager installed on a first computing device is identified. A plurality of queue managers may be installed on the first computing device. The queue manager is part of a failover cluster that includes at least one pair of queue managers capable of performing the same functions. The at least one pair of queue managers includes the queue manager, which is installed on the first computing device, and a backup queue manager installed on a second computing device. The at least one pair of queue managers requires access to a core configuration file located in a data store to operate. A core configuration file, and how it may be accessed through a file directory associated with a queue manager, has been explained previously.

At Step 720, the queue manager is determined not to have access to the core configuration file. As described previously, the queue manager may be determined not to have access to the core configuration file by inspecting a file directory associated with the queue manager. At Step 730, a record that indicates the at least one queue manager should not be monitored is stored. Embodiments of the present invention could be performed by a different computing device that has access to both the first and second computing devices. Embodiments of the present invention could also be performed on either or on both the first and second computing devices.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of discovering whether an individual queue manager is currently active in a failover environment that includes at least two computing devices and a data store that is accessible to the at least two computing devices, the method comprising:

for each queue manager installed on a computing device, identifying a file directory associated with the queue manager, wherein each queue manager is associated with a respective file directory;

discovering whether an individual queue manager is currently active in a failover environment by determining whether said each queue manager has access to a core configuration file through the respective file directory associated with said each queue manager, wherein each queue manager accesses the core configuration file through the respective file directory when the core configuration file is mapped to the respective file directory, and wherein the core configuration file is mapped to the respective file directory when the queue manager is active and the core configuration file is not mapped to the respective file directory when the queue manager is inactive; and communicating an instruction to monitor the each queue manager associated with the file directory determined to have access to the core configuration file.

2. The media of claim 1, wherein the method further includes accessing a file indicating each of queue managers installed on the computing device.

3. The media of claim 1, wherein the method further includes, communicating a new instruction not to monitor the each queue manager associated with a directory that is determined not to have access to the core configuration file.

4. The media of claim 1, wherein the method further includes repeating the method of claim 1 before each monitoring cycle is performed by a monitoring agent.

5. The media of claim 1, wherein the instruction is sent to a monitoring agent that monitors functions of the queue manager.

6. The media of claim 5, wherein the method further includes changing a monitoring setting based on the instruction, wherein the monitoring setting is used to determine whether the queue manager should be monitored or not monitored.

7. The media of claim 1, wherein the core configuration file is a QM.INI file that is stored in the data store.

8. One or more non-transitory computer-readable media having computer-executable instructions embodied thereon for performing a method of determining whether a program that is installed on a computing device is active, the method comprising:
- identifying a file directory associated with a backup queue manager that is one of a plurality of programs installed on the computing device, wherein the program is part of a failover cluster that includes at least one pair of programs that are capable of performing the same functions, wherein the at least one pair of programs includes the backup program installed on the computing device and a primary queue manager installed on a different computing device, wherein the primary queue manager is associated with a first file directory and the backup queue manager is associated with a second file directory, wherein the backup queue manager becomes active only when the primary queue manager fails, and wherein the at least one pair of programs requires access to a common configuration object located in a data store to operate;
- determining whether the backup queue manager is active by determining whether the common configuration object is mounted to the second file directory associated with the backup queue manager,
  - A) wherein when the common configuration object is mounted to the second file directory, then the backup queue manager currently has access through the second file directory to the common configuration object, and the backup queue manager is determined to be active, and
  - B) wherein when the common configuration object is not mounted to the second file directory, then the backup queue manager currently does not have access through the second file directory to the common configuration object, and the backup queue manager is determined to be inactive;
- upon determining that the common configuration object is not mounted to the second file directory associated with the backup queue manager, wherein the backup queue manager does not currently have access through the second file directory to the common configuration object, and wherein the backup queue manager is determined to be inactive, then storing a record that indicates the backup queue manager should not be monitored.

9. The media of claim 8, wherein the method further includes communicating the record to a monitoring agent that looks for problems with the backup queue manager and generates an alarm when a problem is detected.

10. The media of claim 8, wherein the method further includes:
- determining that a different program in the plurality of programs has access to a different common configuration object through a different file directory associated with the different program; and
- storing a different record that indicates the different program should be monitored.

11. The media of claim 10, wherein the method further includes communicating the different record to a monitoring agent that looks for problems with the different program and generates an alarm when a problem is detected.

12. The media of claim 8, wherein the common configuration object is one or more of a core configuration file that is mounted to the backup queue manager's file directory when the backup queue manager becomes active, a core file directory that is accessible only when the backup queue manager is active, and a QM.INI file.

13. The media of claim 12, wherein the plurality of programs are queue managers that manage queues in a messaging-middleware program.

14. The media of claim 13, wherein the plurality of programs include both active programs and inactive programs.

15. The media of claim 8, wherein the plurality of programs are queue managers that manage queues in a messaging-middleware program.

16. One or more non-transitory computer-readable media having computer-executable instructions embodied thereon for performing a method of determining whether a queue manager in a clustered failover environment is active, the method comprising:
- identifying the queue manager installed on a first computing device, wherein the queue manager is part of a failover cluster that includes at least one pair of queue managers capable of performing the same functions, wherein the at least one pair of queue managers includes the queue manager and a backup queue manager installed on a second computing device, wherein the queue manager and the backup queue manager are each associated with a respective file directory, wherein the backup queue manager is configured to take over the functions of the queue manager when the queue manager fails, wherein each of the queue manager and the backup queue manager requires access to a common core configuration file located in a data store to operate, and wherein each of the queue manager and the backup queue manager accesses the common core configuration file through the respective file directory when the common core configuration file is mapped to the respective file directory;
- determining that one of the queue manager and the backup queue manager is inactive by determining that the common core configuration file is not mapped to the respective file directory associated with the one of the queue manager and the backup queue manager, wherein the one of the queue manager and the backup queue manager does not have access to the common core configuration file through the respective file directory; and
- based on the determination that the one of the queue manager and the backup queue manager is inactive, then storing a record that indicates the inactive one of the queue manager and the backup queue manager should not be monitored.

17. The media of claim 16, wherein the method further includes communicating the record to a monitoring agent that looks for problems with the queue manager and generates an alarm when a problem is detected.

18. The media of claim 16, wherein the method further includes:
- determining that the backup queue manager has access to the core configuration file; and
- storing a different record that indicates the backup queue manager should be monitored.

19. The media of claim 18, wherein the method further includes communicating the different record to a monitoring agent that looks for problems with the backup queue manager and generates an alarm when a problem is detected.

20. The media of claim 19, wherein the method further includes identifying a file directory associated with the queue manager and determining the queue manager does not have access to the core configuration file by inspecting the file directory.

* * * * *